United States Patent [19]

Nomura

[11] 4,414,458
[45] Nov. 8, 1983

[54] WIRE-CUT, ELECTRIC DISCHARGE MACHINE

[75] Inventor: Yoshiyuki Nomura, Hino, Japan

[73] Assignee: Fujitsu Fanuc Limited, Tokyo, Japan

[21] Appl. No.: 249,834

[22] Filed: Apr. 1, 1981

[30] Foreign Application Priority Data

Apr. 14, 1980 [JP] Japan .................... 55-48969

[51] Int. Cl.³ .............................................. B23P 1/08
[52] U.S. Cl. .............................................. 219/69 W
[58] Field of Search ............... 219/69 W, 69 M, 69 R

[56] References Cited

U.S. PATENT DOCUMENTS 3,912,899 10/1975 Lehmann et al. ............. 219/69 W
3,987,270 10/1976 Ullmann et al. ............. 219/69 W
4,123,645 10/1978 Shichida et al. ............. 219/69 W
4,242,559 12/1980 Roemer et al. ............. 219/69 W

FOREIGN PATENT DOCUMENTS 2809339 9/1978 Fed. Rep. of Germany ... 219/69 W

*Primary Examiner*—C. C. Shaw
*Attorney, Agent, or Firm*—Staas & Halsey

[57] ABSTRACT

In a wire-cut, electric discharge machine equipped with an automatic wire electrode threading mechanism, a straightening guide having a curved surface which guides thereacross a wire electrode while straightening it out. The straightening guide is positioned directly in front of feed-up rollers which grip the wire electrode released from a supply reel and guide it into a machining starting hole of a workpiece.

13 Claims, 8 Drawing Figures

WIRE-CUT, ELECTRIC DISCHARGE MACHINE

BACKGROUND OF THE INVENTION

1. Field of the Invention

The present invention relates to an improvement in a wire-cut, electric discharge machine provided with a mechanism for automatically installing a wire electrode on its travelling system.

2. Description of the Prior Art

A wire-cut, electric discharge machine is advantageous in that it is capable of machining, for example, a metal mold of complicated configuration with high accuracy through the use of a thin wire electrode. However, such a machine has the defect of low cutting speed. For substantial reductions of labor expenditures during prolonged machining operations, full automation of the wire-cut, electric discharge machine is desired.

An automatic wire threading mechanism which is suitable for continuous, unattended machining of many independent configurations in the same workpiece has been proposed for wire-cut, electric discharge machining. The arrangement of a prior art example of such a mechanism is shown in FIG. 1. In FIG. 1, reference numeral 1 indicates a workpiece; 1a designates a machining starting hole; 2 identifies a wire serving as a working electrode; 3 denotes a supply reel; 4 represents a tension brake; 5 and 6 show guide rollers; 7a and 7b refer to feed-up rollers; 8 and 9 indicate guides; 10 designates a wire clamp; 11a and 11b identify upper feed rollers; and 12 denotes a take-up reel.

For automatic threading of the wire 2 in FIG. 1, the wire 2 is delivered from the supply reel 3, is drawn across the tension brake 4 and the guide rollers 5 and 6, and is gripped by the two feed-up rollers 7a and 7b to run therethrough into the machining starting hole 1a of the workpiece 1. The wire 2 is further projected upwardly through the workpiece 1, is pulled up by the wire clamp 10 to the upper feed rollers 11a and 11b, and is fed to the take-up reel 12.

Since the automatic wire threading mechanism is designed for unattended operations of the wire-cut, electric discharge machine, the wire threading operation must be dependable. With the conventional arrangement, however, when the wire 2 is brought up by the feed-up rollers 7a and 7b into the machining starting hole 1a after being drawn across the tension brake 4 and the guide rollers 5 and 6, there is the possibility that the wire 2 will be inaccurately inserted into the machining starting hole 1a. Inaccurate insertion makes it difficult to carry out unattended operations of the wire-cut, electric discharge machine. It has recently been shown that such faulty operation is caused by curling of the wire.

SUMMARY OF THE INVENTION

Accordingly, it is an object of the present invention to provide a wire-cut, electric discharge machine having an automatic wire threading mechanism which is designed to ensure a dependable automatic wire threading operation by straightening the wire in the wire travelling system.

According to the present invention, a wire-cut, electric discharge machine having an automatic wire threading mechanism, is provided with a wire straightening guide having a curved surface which guides thereacross the wire while straightening it out. The wire straightening guide is positioned directly in front of the feed-up rollers, which grip therebetween the wire delivered out from the supply reel, to guide the wire into the machining starting hole of a workpiece.

BRIEF DESCRIPTION OF THE DRAWINGS

FIG. 4 being a front view, FIG. 5 a top plan view and FIG. 6 a side view;

DESCRIPTION OF THE PREFERRED EMBODIMENTS

Figure 1:
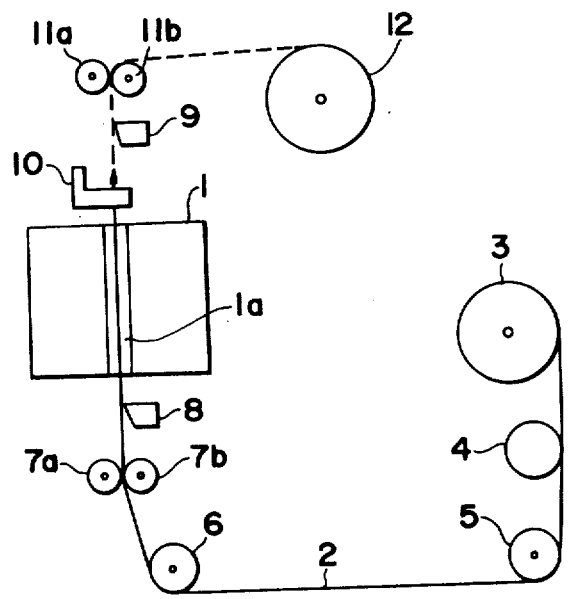
FIG. 1 is a schematic diagram showing the arrangement of a conventional wire-cut, electric discharge machine provided with an automatic wire threading machine.
Figure 2:
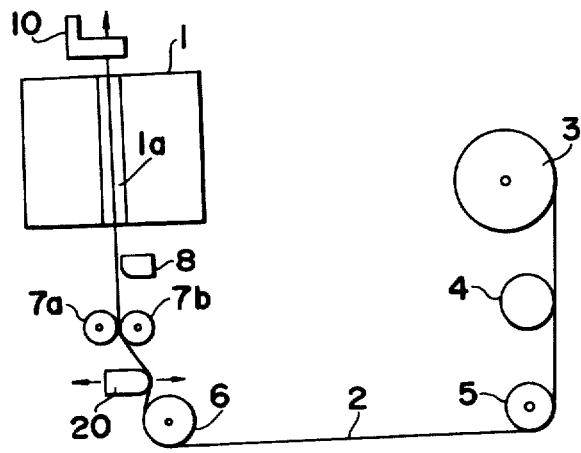
FIG. 2 is a schematic diagram showing a preferred embodiment of the wire-cut, electric discharge machine of the present invention.

FIG. 2 schematically illustrates a preferred embodiment of the present invention, in which components corresponding to those in FIG. 1 are identified by the same reference numerals. Reference numeral 20 indicates a wire straightening guide.

The wire-cut, electric discharge machine of the present invention differs from the prior art example of FIG. 1 in that a wire straightening guide 20 is provided directly in front of the feed-up rollers 7a and 7b. The feed-up rollers grip therebetween the wire 2 released from the supply reel 3 and guide the wire 2 through the machining starting hole 1a of the workpiece 1. The wire straightening guide 20 has a curved surface and is mounted on a mounting plate (not shown) in such a manner that the curved surface is urged against the wire 2 from the left-hand direction in FIG. 2. The reason why the curved surface of the wire straightening guide 20 is pressed against the wire 2 from the left-hand direction is that, in the illustrated embodiment, the wire 2 is subjected to clockwise bending by the supply reel 3 and the guide rollers 5 and 6. Therefore, it is necessary to correct the clockwise bending by bending the wire 2 in a counter-clockwise direction. Alternatively, in a wire travelling system in which the wire is bent in a counter-clockwise direction, the wire straightening guide 20 would be disposed on the right of the wire 2, with the curved surface directed thereto.

Using the present invention, the wire 2 travels across the curved surface of the wire straightening guide 20 while bending counter-clockwise, thereby removing its clockwise bending and ensuring that the wire 2 travels vertically between the feed-up rollers 7a and 7b. Consequently, the wire 2 smoothly passes through the machining starting hole 1a without striking the underside of the workpiece 1. Thus, the wire 2 is automatically installed in the wire travelling system.

The strength of the curl of the wire 2 differs according to the material and diameter of the wire and the arrangement of the wire travelling system. Accordingly, an optimum wire straightening effect can be produced by mounting the wire straightening guide 20 on a slider so that it is adjustable in the directions of arrows in FIG. 2 in accordance with the various wires used. In this embodiment, the wire straightening guide 20 is not a rotating member like the guide rollers 5 and 6, but is a fixed pin.

Figure 3:
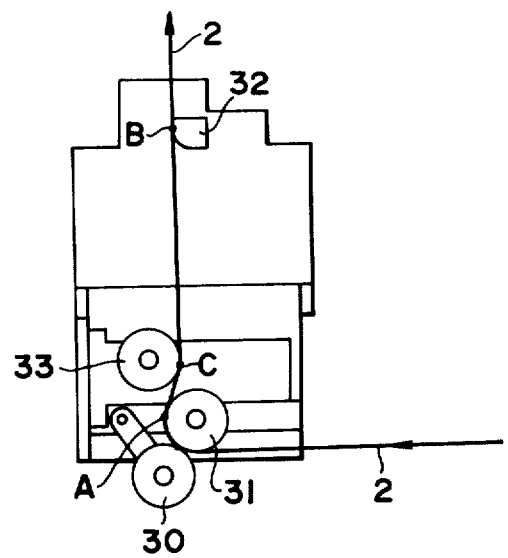
FIG. 3 is a schematic diagram illustrating another embodiment of the present invention.

FIG. 3 illustrates another embodiment of the present invention employing a rotating guide roll as the wire straightening guide.

The wire 2 is stretched between a straightening roll 31 and a guide 32 and fed upwardly. On a line connecting a wire electrode outgoing point A on the outer periphery of the straightening roll 31 and a wire electrode supporting point B on the guide 32, a guide roller 33 is disposed in such a manner as to press the wire 2 away from the aforesaid line.

In the embodiment of FIG. 3, the wire 2 which has not reached the straightening roll 31 has a bend that tends to make the wire 2 deviate to the left from the abovesaid line between the points A and B, but since the wire electrode guide point C of the guide roller 33 lies on the right of the line connecting the points A and B, the above-mentioned bend of the wire 2 is removed while it travels from the point A to B via the point C.

In FIG. 3, reference numeral 30 indicates a hold roller which prevents the wire 2 from falling off the straightening roll 31 when the wire 2 is broken.

Figure 4:
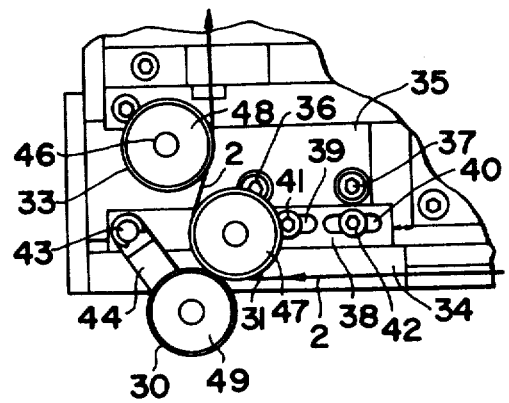
FIGS. 4 to 6 are partially enlarged diagrams showing the embodiment of FIG. 3.
Figure 5:
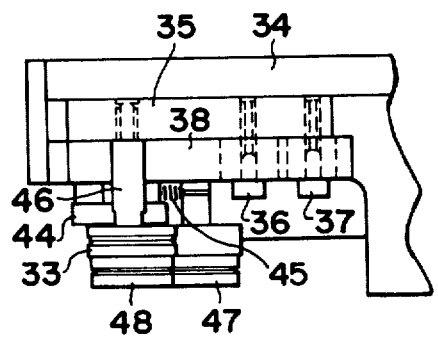
Figure 6:
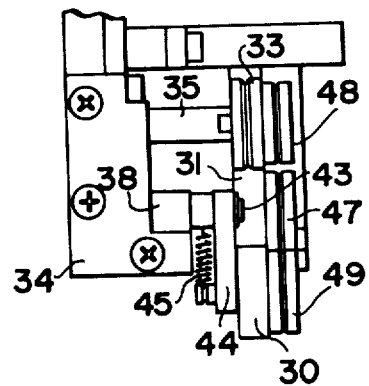

FIGS. 4 to 6 are partially enlarged diagrams of the embodiment shown in FIG. 3.

As will be seen from FIGS. 4 to 6, a sub-base 35 is fixedly mounted on a stationary base 34 by means of a pair of bolts 36 and 37 and a slider 38 is provided in a space defined by the top surface of the base 34 and the front of the sub-base 35. The slider 38 has a pair of horizontally extending guide holes 39 and 40 and is fixed to the sub-base 35 by a pair of bolts 41 and 42 which are threadably engaged with the sub-base 35 through the guide holes 39 and 40, respectively. On the slider 38 is rotatably supported the straightening roll 31, and the hold roller 30 is also rotatably supported on an arm 44 which is rotatable about a shaft 43 on the slider 38. By a spring 45 stretched between the arm 44 and the slider 38, the hold roller 30 is biased to be urged against the straightening roll 31.

The guide roller 33 is rotatably supported by a shaft 46 fixedly screwed into the sub-base 35.

Accordingly, by loosening the pair of bolts 41 and 42, the slider 38 can be slid to the right and left on the base 34 to permit adjustment of the relative positions of the points A, B and C referred to previously with respect to FIG. 3. By tightening the bolts 41 and 42, after moving the slider 38 to a proper position, the straightening roll 31 can be positioned. Reference numerals 47, 48 and 49 identify bearing caps.

The rollers 30 and 33 and the straightening roll 31 are formed of a plastic material which has a high degree of insulation and wear resistance.

Figure 8:
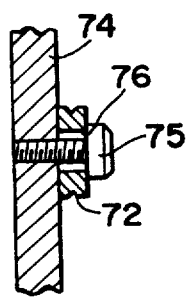
FIG. 8 is an enlarged diagram showing the straightening roll of the embodiment depicted in FIG. 7.
Figure 7:
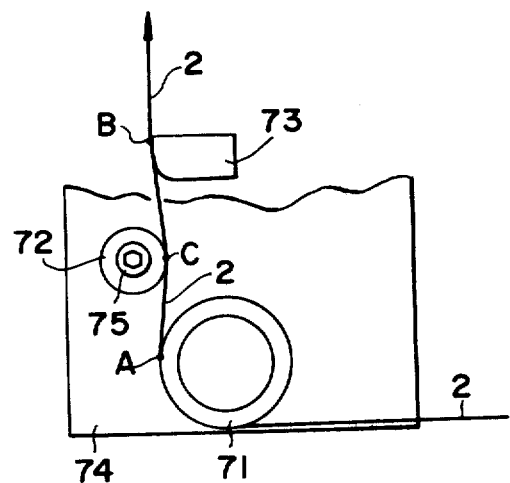
FIG. 7 is a schematic diagram showing another embodiment of the present invention.

FIG. 7 illustrates another embodiment of the present invention. The wire 2 is fed upwardly via a guide roller 71, a straightening roll 72 and a guide 73. The straightening roll 72 is fixed by a bolt 75 to a base 74, as shown in FIG. 8. Between the outer diameter of the bolt 75 and the inner diameter of the straightening roll 72 exists a clearance 76 of a suitable size. By loosening the bolt 75, the position of the straightening roll 72 can be adjusted. This embodiment differs from the embodiment of FIG. 3 in that the straightening roll 72 does not rotate by itself and can be adjusted in position. The roll 72 and the roller 71 are formed of a highly insulating and wear-resisting plastic material.

As will be appreciated from the foregoing, according to the present invention, a bend in the wire electrode is eliminated by a straightening guide provided directly in front of the feed-up rollers and the wire electrode is fed perpendicularly from the feed-up rollers; consequently, the wire electrode is automatically and dependably installed. Accordingly, the present invention permits prolonged, unattended operations of the wire-cut, electric discharge machine and hence is of great utility. The foregoing embodiments should be construed as being merely illustrative of the present invention and should not be construed in a limiting sense.

It will be apparent that many modifications and variations may be effected without departing from the scope of the novel concepts of the present invention.

What is claimed is:

1. A wire-cut, electric discharge machine for automatically installing a wire electrode in its travelling system, comprising: straightening guide means for guiding thereacross the wire electrode while straightening it out, said straightening guide means being mounted adjacent feed up rollers, and along the travelling system between the feed up rollers and the supply reel to guide the wire from the straightening guide means to the feed up rollers and into a machining starting hole of a workpiece.

2. An electric discharge machine for machining a path in a workpiece having first and second sides by establishing an electric discharge between the workpiece and an elongated electrode while moving the electrode through the workpiece along a substantially straight line from the first side to the second side thereof and changing the relative position of the workpiece with respect to the electrode, the electrode having a tendency to deviate from a straight line unless it is under tension, comprising:

(a) a first rotatably mounted roller spaced apart from the first side of the workpiece, the electrode extending around at least a portion of the first roller;
(b) feed roller means positioned between the first rotatably mounted roller and the first side of the workpiece for feeding the electrode through the workpiece; and
(c) straightening guide means mounted between the first roller and the feed roller means for bending the electrode in the direction opposite to its tendency to deviate in order to reduce its tendency to deviate.

3. An improved electric discharge machine of the type provided with a means for automatically installing an elongated electrode by gripping the elongated electrode with feed-up rollers after the elongated electrode has been released from a supply reel and by guiding the elongated electrode into a machining starting hole in the workpiece, wherein the improvement comprises:

straightening guide means positioned directly in front of the feed-up rollers and between the feed-up rollers and the supply reel for straightening the elongated electrode out, said straightening guide means having a curved surface which guides the elongated electrode thereacross.

4. The improved electric discharge machine as defined by claim 3 wherein the elongated electrode released from the supply reel is imparted with a bend in a first direction, and the straightening guide means positioned between the feed-up rollers and the supply reel subjects the elongated electrode to bending in a second direction to remove the elongated electrode's bend in the first direction.

5. The improved electric discharge machine as described in claims 2 or 3 wherein the elongated electrode is a wire electrode.

6. The electric discharge machine defined in claims 1 or 2, wherein the straightening guide means has a curved-surface.

7. The electric discharge machine defined in claim 6 wherein the straightening guide means is fixedly connected to the machine.

8. The electric discharge machine defined in claim 1, 2, or 3, wherein the position of the straightening guide means is adjustable in relation to the path of the wire electrode.

9. The electrode discharge machine defined in claims 1, 2 or 3 wherein the straightening guide means is a cylinder.

10. The electric discharge machine defined by claim 9 wherein the straightening guide means is fixedly connected to the machine.

11. The electric discharge machine defined by claim 9 wherein the straightening guide means is rotatably mounted.

12. The electric discharge machine defined by claim 6 wherein the straightening guide means is fixedly connected to an adjustable slider.

13. The electric discharge machine defined by claim 9 wherein the straightening guide is rotatably mounted on an adjustable slider.

* * * * *